US012528290B2

(12) United States Patent
Nomura

(10) Patent No.: US 12,528,290 B2
(45) Date of Patent: Jan. 20, 2026

(54) RECORDING ELEMENT SUBSTRATE AND RECORDING DEVICE

(71) Applicant: CANON KABUSHIKI KAISHA, Tokyo (JP)

(72) Inventor: Hiroyasu Nomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/513,840

(22) Filed: Nov. 20, 2023

(65) Prior Publication Data

US 2024/0165948 A1 May 23, 2024

(30) Foreign Application Priority Data

Nov. 18, 2022 (JP) ................................ 2022-184691

(51) Int. Cl.
*B41J 2/14* (2006.01)
*B41J 2/045* (2006.01)
*B41J 2/05* (2006.01)

(52) U.S. Cl.
CPC ....... *B41J 2/14056* (2013.01); *B41J 2/04531* (2013.01); *B41J 2/0458* (2013.01); *B41J 2/05* (2013.01); *B41J 2/14072* (2013.01); *B41J 2/14153* (2013.01)

(58) Field of Classification Search
CPC .. B41J 2/14056; B41J 2/04531; B41J 2/0458; B41J 2/05; B41J 2/14072; B41J 2/14153; B41J 2/04563; B41J 2002/14467; B41J 2202/13; B41J 2202/18; B41J 2/14129; B41J 2/1404
See application file for complete search history.

(56) References Cited

U.S. PATENT DOCUMENTS 8,876,242 B2 11/2014 Tamaru et al.
2013/0187987 A1* 7/2013 Kubota ................. B41J 2/1628 216/27

FOREIGN PATENT DOCUMENTS

JP 2010-280213 A 12/2010

* cited by examiner

*Primary Examiner* — Thinh H Nguyen
(74) *Attorney, Agent, or Firm* — Venable LLP

(57) ABSTRACT

A recording element substrate includes a plurality of discharging ports; a plurality of nozzles connected to the plurality of discharging ports, respectively; a passage forming portion in which a plurality of individual passages connected to the plurality of nozzles, respectively, and a common passage connected to the plurality of individual passages are formed; a plurality of supply ports disposed at positions corresponding to a plurality of nozzle groups on the common passage, respectively, along an array direction of the plurality of discharging ports; and a plurality of supply passages which extend from the plurality of supply ports to a rear surface of the recording element substrate in a direction intersecting with the rear surface. A plurality of heaters configured to heat liquid flowing through the common passage are provided for each of the plurality of supply ports along at least a part of a peripheral edge of the supply port.

19 Claims, 9 Drawing Sheets

RECORDING ELEMENT SUBSTRATE AND RECORDING DEVICE

BACKGROUND OF THE INVENTION

Field of the Invention

The present invention relates to a recording element substrate and a recording device.

Description of the Related Art

Some inkjet recording devices, which discharge ink through nozzles and allow ink to adhere to a recording medium (e.g., paper), include a heater to apply energy to discharge ink through the nozzles, and a sub-heater to heat the ink before discharging.

For example, in the case of an inkjet recording device according to Japanese Patent Application Publication No. 2010-280213, a long ink supply port is formed on a substrate, and a nozzle array, which is constituted of a plurality of nozzles arranged in an extending direction of the ink supply port, is disposed on both sides of the ink supply port. Further, a heater forming region, where a discharging heater for ink for each nozzle is formed, is disposed on the outer side of each nozzle array, and a sub-heater is disposed on the outer side of the heater forming region so as to surround three sides of a long rectangular region, including the ink supply port and the heater forming region. Both ends of the sub-heater are connected to a sub-heater power supply terminal, and the sub-heater, to which voltage is applied, heats up to heat the entire substrate, and the ink supplied from the ink supply port is heated. As a result, a drop in the temperature of the ink is suppressed, and the discharge amount fluctuation and discharge failure due to an increase in viscosity are suppressed.

In Japanese Patent Application Publication No. 2010-280213, however, the sub-heater is disposed on the opposite side of the ink supply port with the nozzles therebetween, hence in a case of high print duty recording, where the ink flow rate on the nozzle passage is high, in particular, ink which is not sufficiently heated by the sub-heater may be discharged.

SUMMARY OF THE INVENTION

The present invention provides a recording element substrate and a recording device equipped with a sub-heater that can heat such liquid as ink more efficiently.

One aspect of the present invention is directed to a recording element substrate comprising:

a discharging port array which is disposed on a front surface of the recording element substrate, and includes a plurality of discharging ports arrayed in an array direction;

a plurality of nozzles which extend in a direction intersecting with the front surface of the recording element substrate, and are connected to the plurality of discharging ports, respectively;

a passage forming portion in which a plurality of individual passages and a common passage are formed, the plurality of individual passages extending in a direction along the front surface of the recording element substrate and being connected to the plurality of nozzles, respectively, and the common passage being connected to the plurality of individual passages;

a plurality of supply ports which are disposed on the common passage and are arrayed along the array direction, and are disposed such that, in a case where the plurality of nozzles are divided into a plurality of nozzle groups and each nozzle group includes one or a plurality of nozzles, the plurality of supply ports are disposed at positions corresponding to the plurality of nozzle groups on the common passage, respectively; and a plurality of supply passages which extend from the plurality of supply ports to a rear surface of the recording element substrate in a direction intersecting with the rear surface of the recording element substrate, wherein a plurality of heaters configured to heat liquid flowing through the common passage are provided for each of the plurality of supply ports along at least a part of a peripheral edge of the supply port.

Further features of the present invention will become apparent from the following description of exemplary embodiments with reference to the attached drawings.

DESCRIPTION OF THE EMBODIMENTS

Embodiments of the present invention will be described with reference to the drawings. Embodiments to be described below are examples embodying the present invention and are not intended to limit the scope of the present invention thereto. Unless otherwise specified, dimensions, shapes, numbers, materials and the like of various members in the following embodiments can be appropriately changed within the scope of the invention.

Figure 7B:
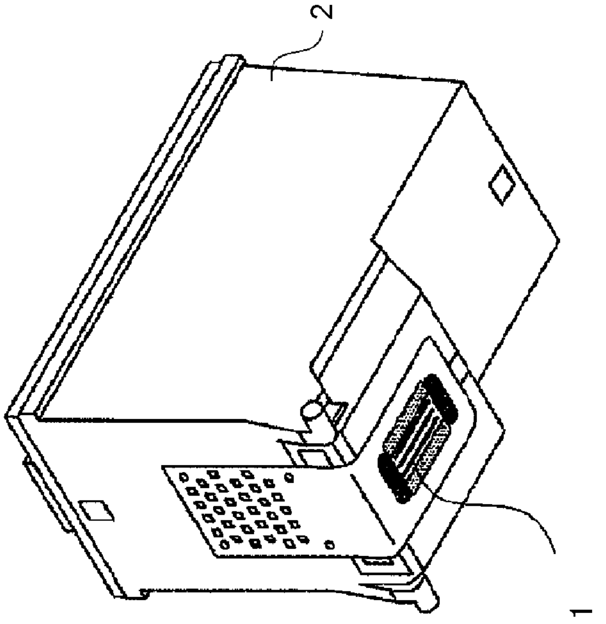
FIG. 7B is a view of a liquid discharging head thereof.
Figure 7A:
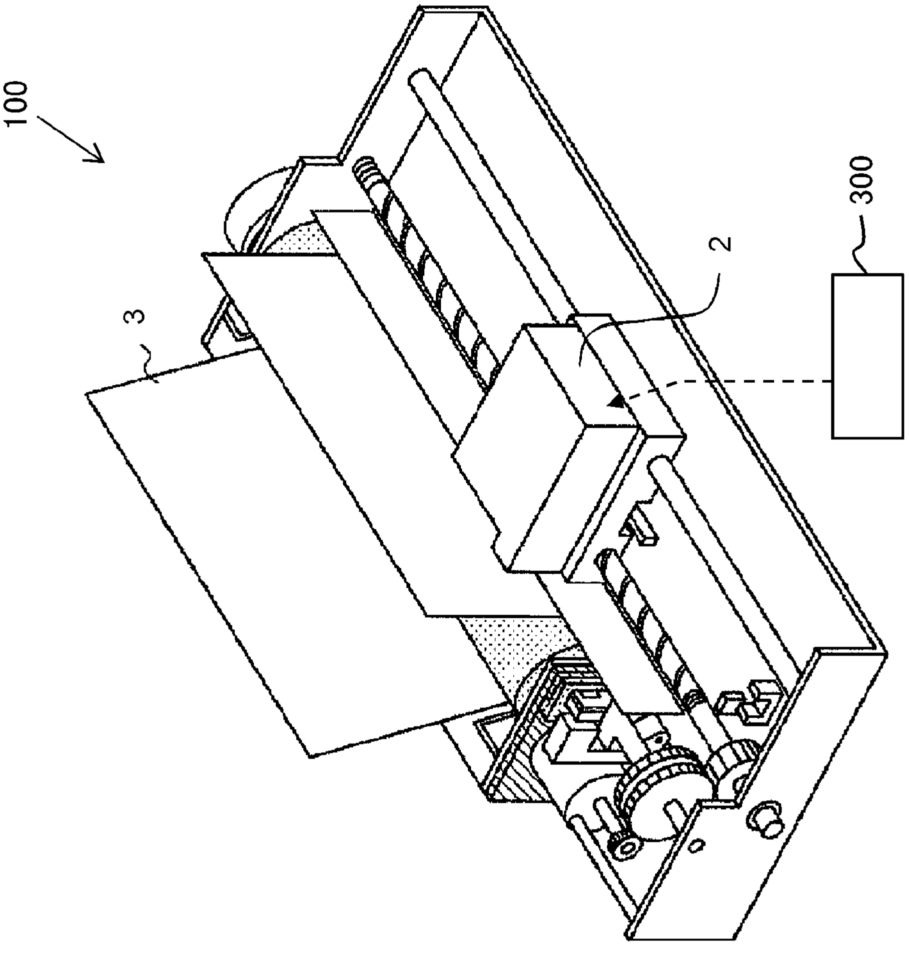
FIG. 7A is a view of a recording device of an embodiment.

FIGS. 7A and 7B are schematic diagrams depicting a configuration of major portions of a serial type inkjet recording device to which the present invention is applicable. FIG. 7A is a general view depicting a general configuration of the inkjet recording device 100, and FIG. 7B is a perspective view depicting a recording head 2, which is a composing element of the inkjet recording device 100.

In FIGS. 7A and 7B, the recording head 2, which is a liquid discharging head, includes a recording element substrate 1 having a plurality of nozzle arrays each of which is constituted of a plurality of nozzles. The inkjet recording device 100 records an image on a recording medium 3 by discharging ink droplets from discharging ports (not illustrated) corresponding to the nozzles of the recording head 2. The inkjet recording device 100 has a control unit 300 which controls operation of each component constituting the inkjet recording device 100, including the recording element substrate 1 and the recording head 2. The control unit 300 is a computer that includes a CPU, a memory, an input/output unit and the like, and controls the operation of the inkjet recording device 100 based on the image information inputted from the outside and control programs stored in the memory. In particular, the control unit 300 controls the operation of a later mentioned heater and sub-heater, included in the recording element substrate 1.

Embodiment 1

Figure 1:
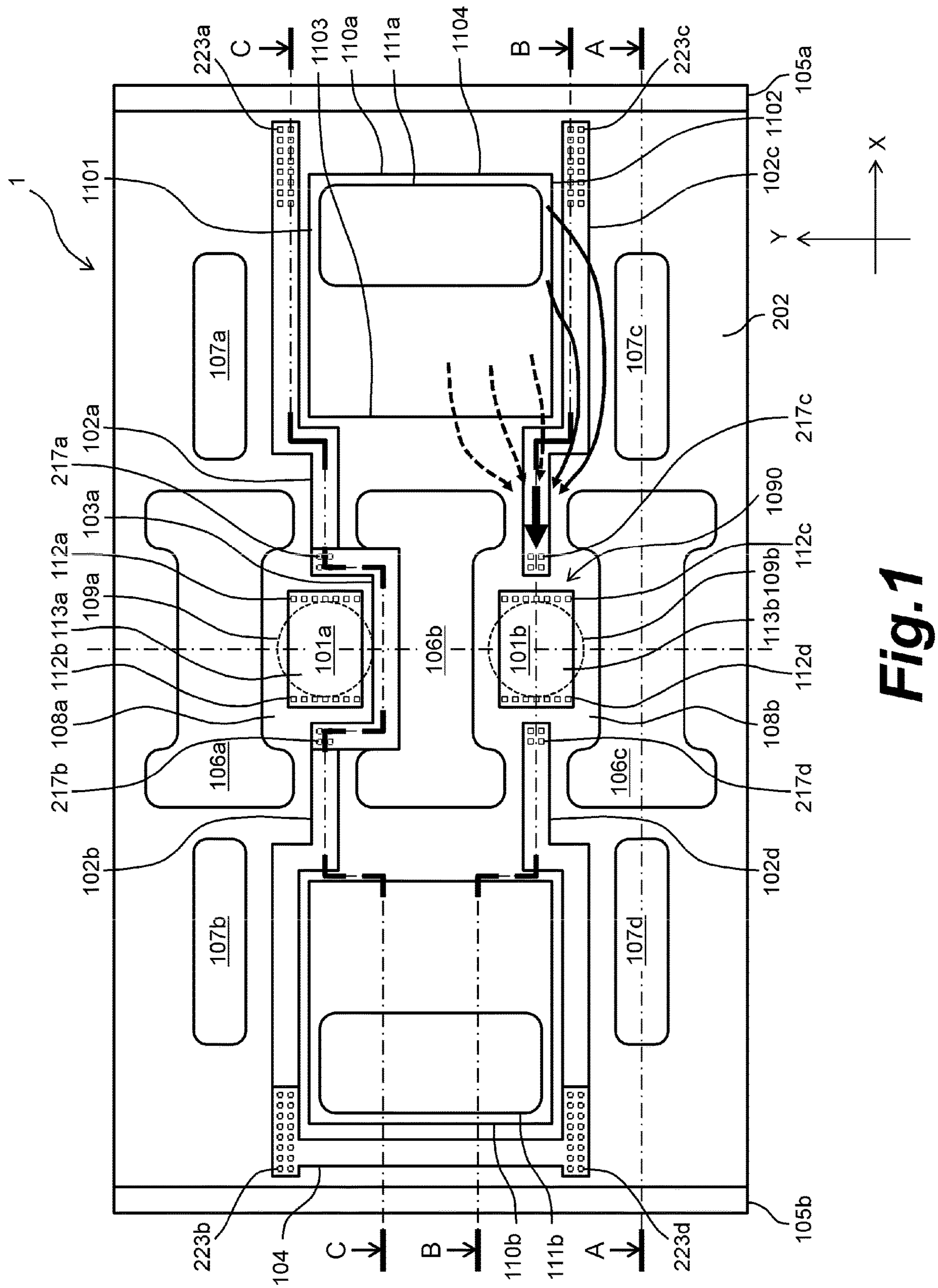
FIG. 1 is a plan view depicting a part of a recording element substrate of Embodiment 1.
Figure 2A:
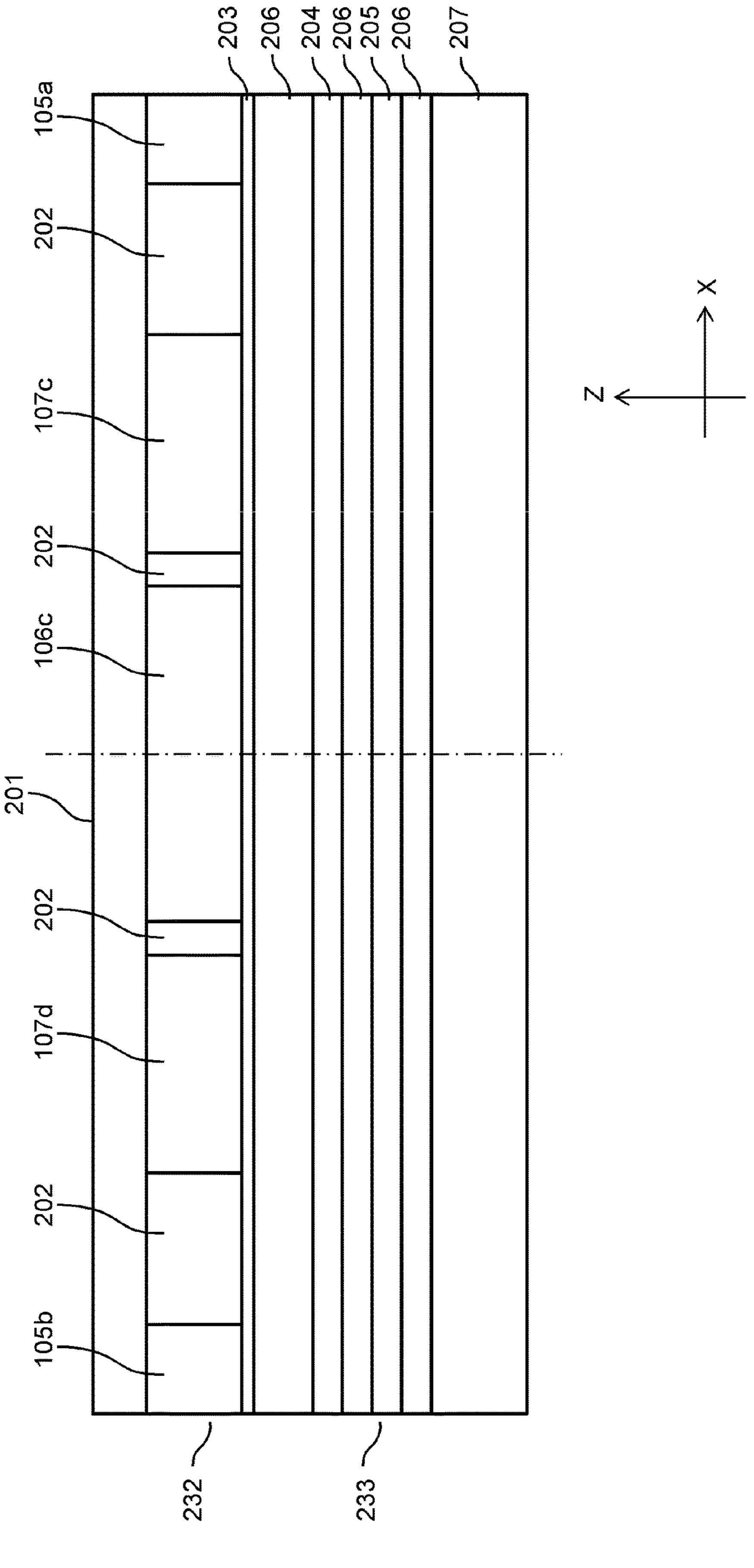
FIG. 2A is an A-A cross-sectional view of the recording element substrate in FIG. 1.
Figure 2B:
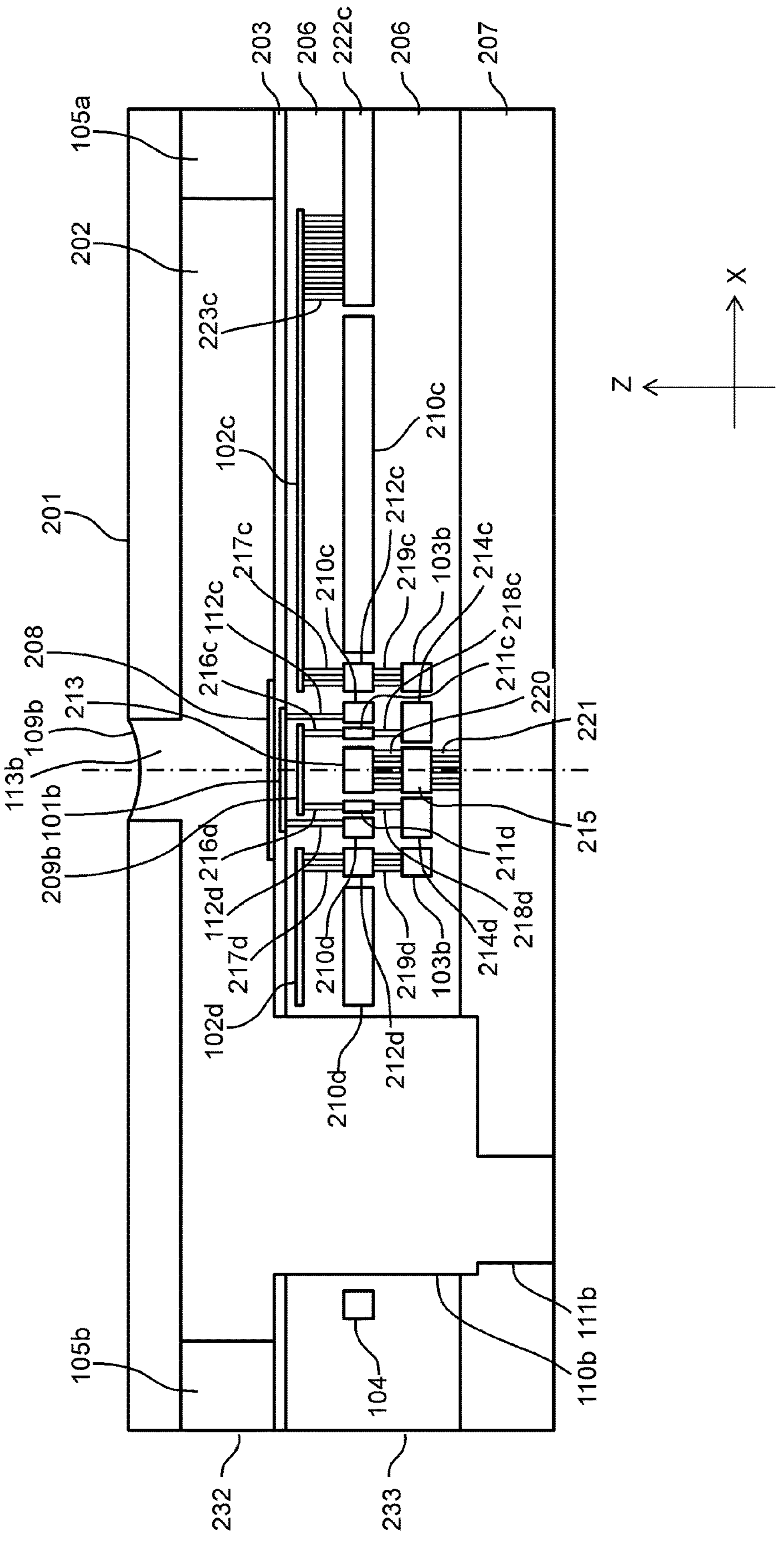
FIG. 2B is a B-B cross-sectional view of the recording element substrate in FIG. 1.
Figure 2C:
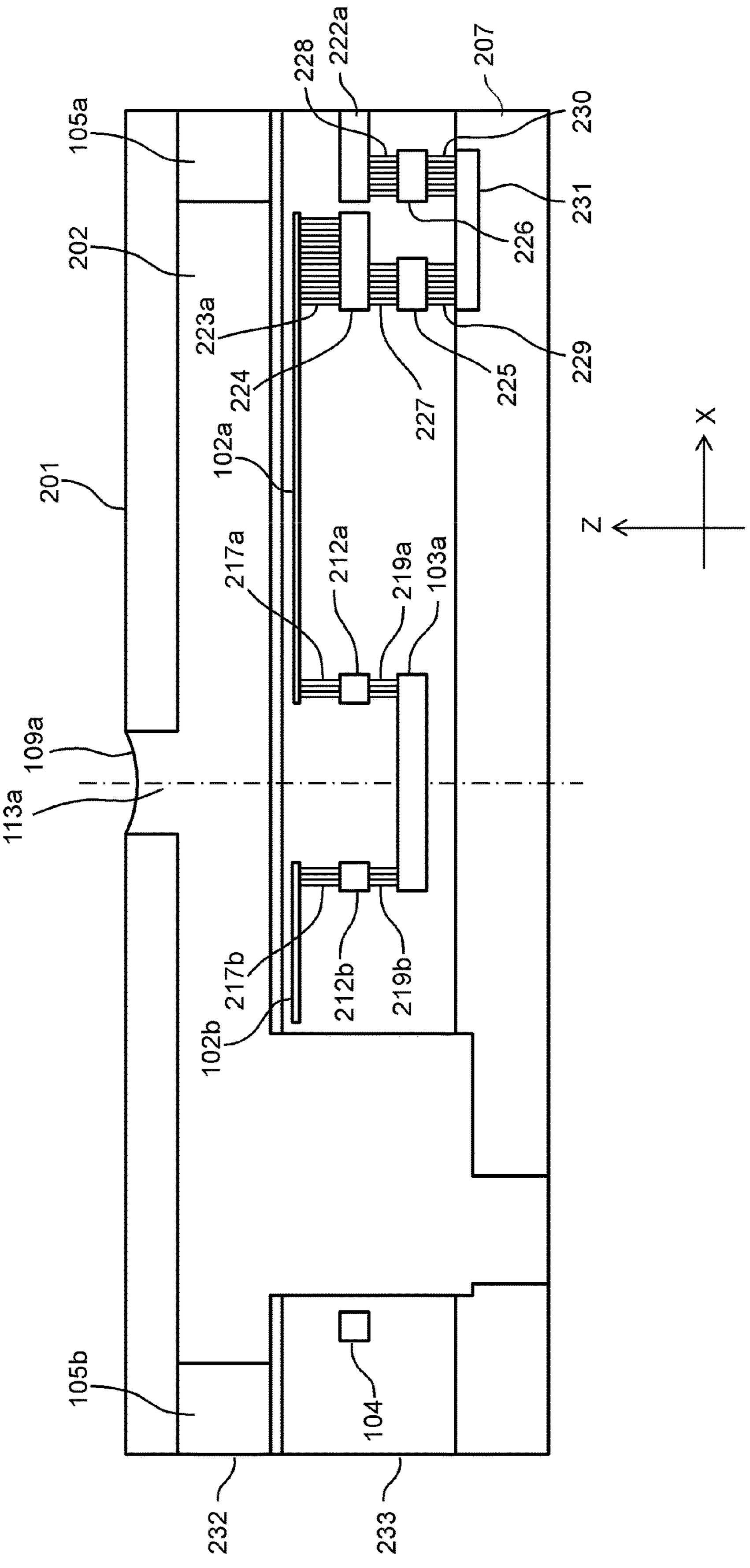
FIG. 2C is a C-C cross-sectional view of the recording element substrate in FIG. 1.

Embodiment 1 of the present invention will be described with reference to the drawings. FIG. 1 is a plan view depicting a part of the recording element substrate 1 according to Embodiment 1. FIG. 1 is a plan view when the recording head 2 is viewed from the substrate side in the ink discharging direction and indicates a portion that includes two nozzles out of a plurality of nozzles disposed on the recording element substrate 1. FIGS. 2A to 2C are cross-sectional views of the nozzles in FIG. 1, where FIG. 2A is an A-A cross-sectional view, FIG. 2B is a B-B cross-sectional view, and FIG. 2C is a C-C cross-sectional view. The structure of the nozzles and the vicinity thereof in Embodiment 1 will be described with reference to FIG. 1 and FIGS. 2A to 2C.

On the recording element substrate 1 which discharges liquid, inter-nozzle array partition walls 105*a* and 105*b*, to separate the nozzle arrays, are formed, and an orifice plate 201 is formed on the inter-nozzle array partition walls 105*a* and 105*b*. The region enclosed by the recording element substrate 1, the inter-nozzle array partition walls 105*a* and 105*b* and the orifice plate 201 becomes an ink passage 202 in the nozzle array.

The ink passage 202 is partitioned by inter-nozzle partition walls 106*a*, 106*b* and 106*c*, and foaming chambers 108*a* and 108*b* are formed between the inter-nozzle partition walls 106*a*, 106*b* and 106*c*. In FIG. 1, nozzles 113*a* and 113*b*, to which discharging ports 109*a* and 109*b* are connected, respectively, are formed on the orifice plate 201, at each center of the foaming chambers 108*a* and 108*b*. On the surface of the recording element substrate 1, the plurality of discharging ports 109*a* and 109*b* are disposed side-by-side in a predetermined array direction (Y direction in FIG. 1), so as to form a discharging port array 1090. The plurality of nozzles 113*a* and 113*b* extend in the direction intersecting with the surface of the recording element substrate 1 (direction vertical to the front surface in Embodiment 1, that is, the Z direction in FIGS. 2A to 2C), and are connected to the plurality of discharging ports 109*a* and 109*b*. The plurality of foaming chambers 108*a* and 108*b* are a plurality of individual passages connected to the plurality of nozzles 113*a* and 113*b*, respectively, and extend in the direction along the front surface of the recording element substrate 1 (direction parallel with the front surface in Embodiment 1, that is, the X direction in FIG. 1). The ink passage 202 is a common passage connected to the foaming chambers 108*a* and 108*b*, which are a plurality of individual passages, and extends in the direction along the front surface of the recording element substrate 1 (direction parallel with the front surface in Embodiment 1, that is, the Y direction in FIG. 1). The layer where the foaming chambers 108*a* and

108*b*, which are individual passages, and the ink passage 202, which is a common passage, are formed is a passage forming portion 232.

Figure 3:
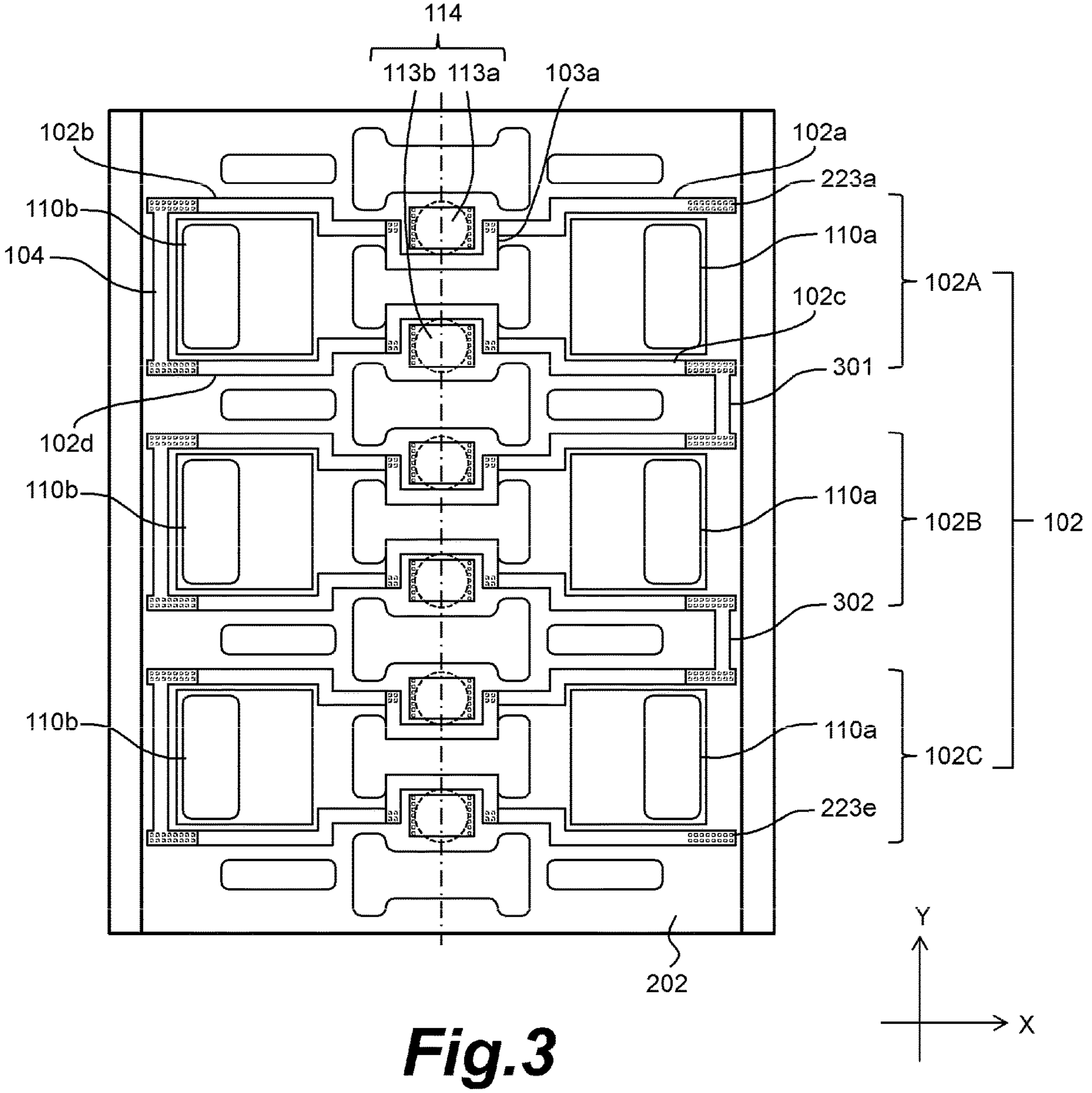
FIG. 3 is a plan view depicting a part of a recording element substrate of a modification of Embodiment 1.

The ink passage 202, excluding the forming chambers 108*a* and 108*b*, is partitioned for each two nozzles by inter-ink supply port partition walls 107*a* and 107*c*, and inter ink supply port partition walls 107*b* and 107*d*. On the bottom surface of the ink passage 202, between the inter-ink supply port partition walls 107*a* and 107*c* and between the inter-ink supply port partition walls 107*b* and 107*d*, a first step of ink supply ports 110*a* and 110*b* (rectangular shape in the plan view) are engraved to be symmetrical with respect to the nozzle array. In Embodiment 1, the plurality of nozzles 113 of the recording element substrate 1 are divided into a plurality of nozzle groups 114, each of which is constituted of one or a plurality of nozzles, as indicated in FIG. 3, which will be referred to in a later mentioned modification of Embodiment 1. In Embodiment 1, one nozzle group 114 is constituted of two nozzles 113*a* and 113*b*, which are adjacent to each other. FIG. 1 indicates the nozzles 113*a* and 113*b* included in one nozzle group 114. A plurality of ink supply ports 110*a* are disposed at positions corresponding to the plurality of nozzle groups 114, respectively, in the ink passage 202, which is a common passage. On the recording element substrate 1, the plurality of nozzle groups 114 are arrayed along the array direction of the nozzles (Y direction in FIG. 3). In FIG. 3, six nozzles 113 are divided into three nozzle groups 114, each of which includes two nozzles 113, respectively.

In the ink supply ports 110*a* and 110*b*, supply passages 111*a* and 111*b* are formed, of which passage cross-sections are smaller than those of the ink supply ports 110*a* and 110*b*, and which penetrate to the rear surface of the recording element substrate 1. The supply passages 111*a* and 111*b* extend in a direction intersecting with the rear surface of the recording element substrate 1 (direction vertical to the rear surface in Embodiment 1, that is, the Z direction in FIGS. 2A to 2C).

In the plan view, the ink supply ports 110*a* and 110*b* are larger than the supply passages 111*a* and 111*b*, respectively. Thereby the pressure loss, generated until the ink that flows from the ink supply ports 110*a* and 110*b* into the ink passages 202 reaches the foaming chambers 108*a* and 108*b*, can be reduced.

By the structure of the ink passage 202 described above, the ink, refilled from the two supply passages 111*a* and 111*b*, flows into the two foaming chambers 108*a* and 108*b* via the ink supply ports 110*a* and 110*b*.

In the recording element substrate 1 immediately below the discharging ports 109*a* and 109*b*, rectangular-shaped heaters 101*a* and 101*b*, constituted of a thin film resistor made of a thermally stable material with high resistivity (e.g., TaSiN), are disposed, respectively. The heaters 101*a* and 101*b* are examples of discharging actuators, which apply energy to ink for discharging ink from the plurality of discharging ports 109*a* and 109*b*. The heaters 101*a* and 101*b*, which are also discharging heaters, are disposed in the foaming chambers 108*a* and 108*b* as well, which are individual passages.

The recording element substrate 1 is configured such that a plurality of wiring layers 204 and 205 are disposed on an insulating member 206 on a substrate 207. The recording element substrate 1 is configured such that a wiring portion 233, constituted of a plurality of inter-layer insulation films (insulator layers) made of insulating member 206 and the plurality of wiring layers 204 and 205 are layered, is disposed between the passage forming portion 232 and the rear surface of the substrate 207. Each of the wiring layers 204 and 205 is disposed between the insulating members 206. A semiconductor material, such as silicon, is used for the substrate 207, and an insulating material, such as silicon oxide, is used for the insulating member 206.

In FIG. 2B, a temperature sensor 209*b*, constituted of a thin film resistor, is disposed in the lower layer of the heater 101*b* via the insulating member 206. The temperature sensor 209*b* preferably is made of a material having a high resistivity, which is equivalent to that of the heater 101*b*, and has a high resistance temperature coefficient in order to increase the output voltage.

As indicated in the plan view in FIG. 1, in the wiring portion 233, sub-heaters 102*a* and 102*c*, configured to heat ink flowing through the ink passage 202, are disposed on the same layer as the temperature sensor 209*b*, along at least a part of the peripheral edge of the ink supply port 110*a*.

In Embodiment 1, the sub-heaters 102*a* and 102*c* are disposed along portions of the peripheral edge of the ink supply port 110*a*, which extend in the direction from the ink supply port 110*a* to the foaming chambers 108*a* and 108*b*, which are individual passages. Specifically, the sub-heaters 102*a* and 102*c* are disposed so as to sandwich the ink supply port 110*a* along the lateral side edges 1101 and 1102 of the peripheral edge of the ink supply port 110*a* in the array direction of the nozzles 113*a* and 113*b* (Y direction in FIG. 1).

Here in Embodiment 1, the peripheral edge of the ink supply port 110*a* has a rectangular shape constituted of a front side edge 1103, a rear side edge 1104, and the two lateral side edges 1101 and 1102. The front side edge 1103 is an edge extending in a direction along the array direction of the plurality of nozzles 113 (Y direction in FIG. 1), out of the edges constituting the peripheral edge of the ink supply port 110*a*, and is an edge located on a side closer to the foaming chambers 108*a* and 108*b*, which are individual passages. The rear side edge 1104 is an edge located on the opposite side of the front side edge 1103, out of the edges constituting the peripheral edge of the ink supply port 110*a*. In other words, the rear side edge 1104 is an edge extending in a direction along the array direction of the plurality of nozzles 113 (Y direction in FIG. 1), and is an edge located on the side closer to the inter-nozzle array partition wall 105*a*. The lateral side edges 1101 and 1102 are edges extending in a direction intersecting with the array direction of the plurality of nozzles 113 (Y direction in FIG. 1), that is, extending in a direction vertical to the array direction in Embodiment 1 (X direction in FIG. 1), out of the edges constituting the peripheral edge of the ink supply port 110*a*.

In Embodiment 1, the foaming chambers (individual passages), the ink passage (common passage), the ink supply port, the supply passages and sub-heaters are disposed on each side of the nozzle array constituted of the plurality of nozzles 113 (on each side thereof in the X direction in FIG. 1), to be symmetric with respect to the nozzle array. Sub-heaters 102*b* and 102*d* are also disposed along the lateral sides of the ink supply port 110*b* in the same manner.

On the heater 101*b*, a protective film 203, made of an insulator, such as SiN, is formed. On this protective film 203, a cavitation resistant film 208 made of Ta or the like is formed at a position corresponding to the heater 101*b*, which is a discharging actuator, so as to cover the region where the heater 101*b* is disposed.

The above-mentioned heater 101*b*, the temperature sensor 209*b* and the sub-heaters 102*a* to 102*d* are electrically connected via the wiring patterns and conductive plugs formed on the plurality of wiring layers, whereby a circuit is formed. In Embodiment 1, the first wiring layer 205 which is closest to the substrate 207, and the second wiring layer 204 which is above the first wiring layer 205 (a total of two wiring layers) are disposed.

In FIG. 2B, the heater 101*b* is connected to a wiring pattern 210*c* of the second wiring layer 204 via a conductive plug 112*c* at one end in a vertical direction (X direction) to the nozzle array direction (Y direction). The heater 101*b* is also connected to a wiring pattern 210*d* of the second wiring layer 204 via a conductive plug 112*d* at the other end. In Embodiment 1, the shape of the heater 101*a* is rectangular, of which long sides are the edges of both ends in the nozzle array direction (Y direction), and the short sides are the edges of both ends in the vertical direction (X direction) to the nozzle array direction. This means that the conductive plugs 112*c* and 112*d* are disposed on both ends of the short sides of the heater 101*b*, respectively. Here it is assumed that the wiring pattern 210*c* is connected to the power supply line, and the wiring pattern 210*d* is grounded via a switch element (not illustrated). The shape of the heater 101*a* here is an example, and the present invention is not limited thereto.

The temperature sensor 209*b* is connected to a pad 211*c* of the second wiring layer 204 via a conductive plug 216*c* disposed on one end, and is connected to a wiring pattern 214*c* of the first wiring layer 205 via a conductive plug 218*c*. A conductive plug 216*d* disposed on the other end is connected to a pad 211*d* in the same manner, and is connected to a wiring pattern 214*d* of the first wiring layer 205 via a conductive plug 218*d*.

Below the heater 101*b*, a heat dissipation pattern 213 is disposed on the second wiring layer 204, the heat dissipation pattern 213 is connected to a heat dissipation pattern 215 of the first wiring layer 205 via a plug 220, and the heat dissipation pattern 215 is connected to the substrate 207 via a plug 221. By this configuration, in a case where the heater 101*b* is driven and heated and this driving is then suppressed, this heat is quickly released to the substrate 207.

The temperature sensor, the heat dissipation pattern, and the wiring structure thereof below the heater 101*a* are the same as those below the heater 101*b*; hence, description thereof will be omitted.

In FIG. 2C, the sub-heater 102*a* is connected to a pad 224 via a conductive plug 223*a* disposed on one end, and is then connected to a switch element 231 formed on the substrate 207 via a conductive plug 227, a pad 225 and a conductive plug 229. The switch element 231 is connected to a wiring pattern 222*a* via a conductive plug 230, a pad 226 and a conductive plug 228, and the wiring pattern 222*a* is connected to a power supply line (not illustrated). By this configuration, when the switch element 231 is ON, the sub-heater 102*a* and the wiring pattern 222*a* conduct, and a predetermined voltage is applied to the sub-heater 102*a*.

The other end of the sub-heater 102*a* is connected to a wiring pattern 103*a* via a conductive plug 217*a*, a pad 212*a* and a conductive plug 219*a*. In the same manner, one end of the sub-heater 102*b* is also connected to the wiring pattern 103*a* via a conductive plug 217*b*, a pad 212*b* and the conductive plug 219*b*. Thereby, the sub-heaters 102*a* and 102*b* are connected in series via the wiring pattern 103*a*. In other words, in Embodiment 1, the two sub-heaters 102*a* and 102*b*, located at symmetric positions with respect to the nozzle array, are electrically connected.

In order to prevent interference with the wiring structure below the heater 101*a*, the wiring pattern 103*a* is disposed in a U shape, so as to bypass a region to which the heater 101*a* is projected in the discharging direction (direction vertical to the front surface of the recording element substrate 1), as illustrated in FIG. 1.

The sub-heaters 102*c* and 102*d* also have the same configuration as the sub-heaters 102*a* and 102*b*. In other words, the other end of the sub-heater 102*c* is connected to a wiring pattern 103*b* via a conductive plug 217*c*, a pad 212*a*, and a conductive plug 219*c*. One end of the sub-heater 102*d* is connected to the wiring pattern 103*b* via a conductive plug 217*d*, a pad 212*d* and a conductive plug 219*d*. Just like the wiring pattern 103*a*, the wiring pattern 103*b* (see FIG. 2B) is also disposed in a U shape, so as to bypass a region to which the heater 101*b* is projected in the discharging direction. This means that the two sub-heaters 102*c* and 102*d*, located at symmetric positions with respect to the nozzle array, are also electrically connected.

The other end of the sub-heater 102*b* is connected to one end of the sub-heater 102*d* via a conductive plug 223*b*, a wiring pattern 104 of the second wiring layer 204, and a conductive plug 223*d*. The sub-heater 102*c* is connected to a wiring pattern 222*c* via a conductive plug 223*c*, and the wiring pattern 222*c* is grounded to a ground line (not illustrated). In other words, in Embodiment 1, the two sub-heaters 102*b* and 102*d*, disposed adjacent to each other in the array direction (Y direction) of the plurality of nozzles 113 in the nozzle array, are electrically connected.

Because of the above configuration, when a switch element 231 is ON, a predetermined voltage is applied between the conductive plugs 223*a* and 223*c*, which are both end terminals of the sub-heater group where the sub-heaters 102*a*, 102*b*, 102*d* and 102*c* are connected in series in this order, and heating is started simultaneously.

At a non-printing time (when image recording is not performed), where the driving voltage is not applied to the heaters 101*a* and 101*b*, the control unit 300 performs control to circulate the ink. Specifically, the control unit 300 controls such that ink is supplied from the ink supply port 110*a* at a low flow rate for ink circulation to prevent drying of the nozzles, and is collected from the ink supply port 110*b* via the foaming chambers 108*a* and 108*b*.

At this time, the control unit 300 performs the PWM control for the switch element 231, so that the ink temperature of ink flowing directly under the discharging ports 109*a* and 109*b* becomes a predetermined target temperature for circulation, whereby the sub-heaters 102*a* to 102*d* are controlled in the low heating mode. The target temperature for circulation is set so that the pre-heating appropriate for ink circulation is performed on the ink that flows into the foaming chambers 108*a* and 108*b*.

At printing time (when image recording is performed), where driving voltage is applied to the heaters 101*a* and 101*b*, the control unit 300 performs control to refill the ink. Specifically, the control unit 300 controls such that ink is refilled from the ink supply ports 110*a* and 110*b* on both sides of the nozzle array, and flows into the foaming chambers 108*a* and 108*b*, respectively. The flow rate of the ink for refilling is higher than the flow rate of the ink for circulation.

At this time, the control unit 300 performs the PWM control for the switch element 231, so that the ink temperature of ink which reached directly under the discharging ports 109*a* and 109*b* becomes a predetermined target temperature for refilling, whereby the sub-heaters 102*a* to 102*d* are controlled in the high heating mode. The target temperature for refilling is set so that a preheating appropriate for printing is performed on the ink that flows into the foaming chambers 108*a* and 108*b*.

In this way, the control unit 300 may control the sub-heaters 102*a* to 102*d* such that the heat value of the sub-heaters 102*a* to 102*d*, in a case of performing the image recording, is higher than the heat value of the sub-heaters 102*a* to 102*d* in the case of not performing the image recording.

As indicated by the solid-lined arrow marks in FIG. 1, the ink refilled from the lateral sides of the ink supply port 110*a* passes above the sub-heater 102*c* along the sub-heater 102*c*; therefore, the ink is heated for a long time. Hence, the degree of increase in the ink temperature near the sub-heater 102*c* is high, and the heat is transferred to the ink that flows at a position near the upper surface of the ink passage 202; that is, the temperature of the ink in the height direction of the ink passage 202 does not disperse very much.

The ink refilled from the front side of the ink supply port 110*a*, on the other hand, only passes a part of the upper portion of the sub-heater 102*c*, as indicated by the broken-lined arrow marks in FIG. 1; therefore, the ink is heated for a short time. Hence, the degree of increase in the ink temperature near the sub-heater 102*c* is low, and the heat is not sufficiently transferred to the ink that flow at a position near the upper surface of the ink passage 202; that is, the temperature of the ink in the height direction of the ink passage 202 tends to easily disperse.

Since each ink of which heating time by the sub-heater 102*c* is different mixes with each other and flows into the foaming chamber 108*b*, the temperature of the ink to be refilled becomes more uniform compared with the configuration of heating only the ink in the passage from the front side of the ink supply port 110*a*. The way of flowing the refill ink and the way of heating the ink by the sub-heater are also the same for the refill ink that flows into the foaming chamber 108*a*.

Thus, according to Embodiment 1, the refill ink that flows from the ink supply port 110*a* into the ink passage 202 is heated by the sub-heaters 102*a* and 102*c*, and flows into the foaming chambers 108*a* and 108*b* in the state where the temperature has uniformly risen. Hence, the discharge amount fluctuation and discharge failure, due to an increase in viscosity of the ink, can be suppressed.

Modification

FIG. 3 is a plan view depicting a part of a recording element substrate of a modification of Embodiment 1. FIG. 3 is a plan view when the recording head 2 is viewed from the substrate side in the ink discharging direction, and indicates a portion including six nozzles out of a plurality of nozzles disposed on the recording element substrate 1. In the modification, a sub-heater group is constituted of four sub-heaters 102*a*, 102*b*, 102*d* and 102*c* of Embodiment 1 connected in series, and three of these sub-heater groups are connected in series in the nozzle array direction, as one sub-heater group 102.

In FIG. 3, three sub-heater groups 102A, 102B and 102C are connected in series by two wiring patterns 301 and 302 of the second wiring layer 204, and function as one sub-heater group 102 to heat ink for the six nozzles.

When the switch element 231 (see FIG. 2C) is turned ON, a predetermined voltage is applied between the conductive plugs 223*a* and 223*e*, which become both terminals of the sub-heater group 102, and heating starts at the same time.

For example, to control the heating value of the sub-heater group 102, the heating value may be controlled in accordance with a nozzle of which ink discharging frequency is highest among the six nozzles. The method for controlling the heating value, however, is not limited to this example. Compared with a case of disposing the switch element 231 for each sub-heater group constituted of four sub-heaters 102*a*, 102*b*, 102*d* and 102*c*, as in the configuration in FIG. 1, a total number of switch elements can be ⅓ in this modification, and the total number of sub-heaters which are targets of the heating control can also be ⅓. Therefore, the heating control for the sub-heater groups can be simplified.

Embodiment 2

Embodiment 2 of the present invention will be described. A composing element the same as Embodiment 1 will be denoted with a same reference sign and name, and detailed description thereof will be omitted.

Figure 4:
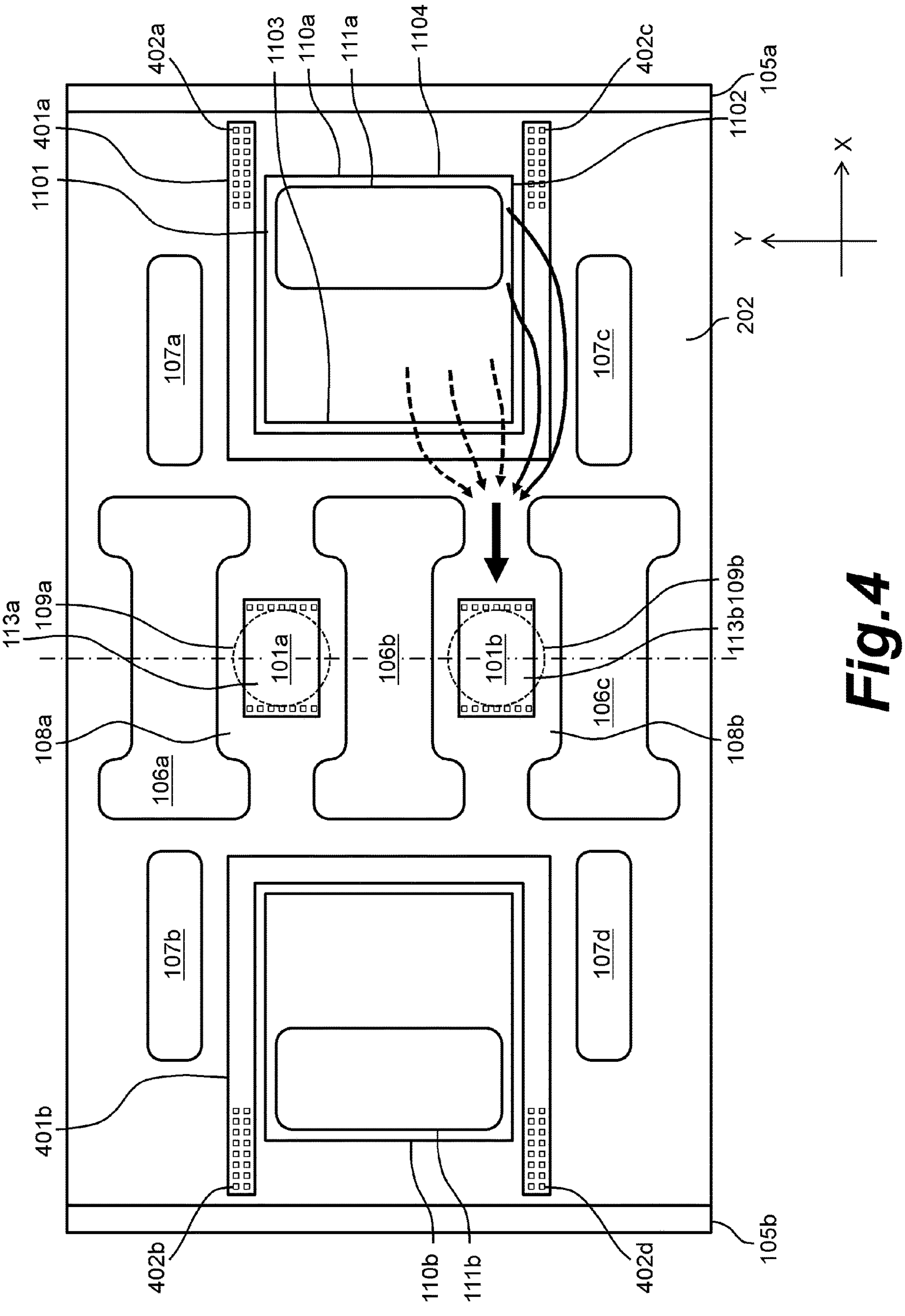
FIG. 4 is a plan view depicting a part of a recording element substrate of Embodiment 2.

FIG. 4 is a plan view depicting a part of the recording element substrate 1 according to Embodiment 2. FIG. 4 is a plan view when the recording head 2 is viewed from the substrate side in the ink discharging direction, and indicates a portion including two nozzles out of a plurality of nozzles disposed on the recording element substrate 1. In Embodiment 2, each sub-heater is disposed in a U shape on the same layer as the temperature sensor installed on the recording element substrate 1, so as to surround the front side and both lateral sides of the ink supply port.

In a case where the height of the ink passage 202 is relatively high, a flow of the ink stagnates behind the ink supply port 110*a*. Therefore, when refilled, ink flows into the ink passage 202 from the ink supply port 110*a* mainly from the front side and lateral sides.

In Embodiment 2, as illustrated in FIG. 4, a sub-heater 401*a* is disposed in a U shape, so as to surround the front side and lateral sides of the ink supply port 110*a*. Specifically, each of the sub-heaters 401*a* and 401*c* is disposed along the lateral side edges 1101 and 1102 and the front side edge 1103 out of the peripheral edges of the ink supply port 110*a*, so as to surround the ink supply port 110*a* in a U shape.

One end of the sub-heater 401*a* is connected to a switch element (not illustrated) via a conductive plug 402*a*, and the switch element is connected to a power supply line (not illustrated) via a wiring pattern of the second wiring layer 204. The other end of the sub-heater 401*a* is connected to the wiring pattern (not illustrated) of the second wiring layer 204 via a conductive plug 402*c*, and this wiring pattern is ground to a ground line (not illustrated). These configurations are the same as those of the sub-heaters 102*a* and 102*c* in Embodiment 1.

As indicated by the broken-lined arrow marks in FIG. 4, according to the configuration of the sub-heater 401*a* of Embodiment 2, the ink that flows from the front side of the ink supply port 110*a* into the ink passage 202 can be heated by the sub-heater 401*a*.

The relationship between a sub-heater 401*b* and the ink supply port 110*b* is the same as the relationship between the sub-heater 401*a* and the ink supply port 110*a*. The configuration of the sub-heater 401*b* and conductive plugs 402*b* and 402*d* are the same as the configuration of the sub-heater 401*a* and the conductive plugs 402*a* and 402*c*.

In Embodiment 2, the control unit 300 may be able to individually control the heating by the sub-heaters 401*a* and 401*b*. Here in the case of performing image recording, it may be controlled to heat both of the sub-heaters 401*a* and 401*b* disposed on each side of the nozzle array by allowing ink to flow into the ink passage 202 from both the ink supply ports 110*a* and 110*b* disposed on each side of the nozzle array. In the case of not performing image recording, it may be controlled to circulate the ink by allowing ink to flow into the ink passage 202 from one ink supply port 110*a*, and allowing ink to flow from the other ink supply port 110*b*, and to heat only the sub-heater 401*a*, which is disposed on the peripheral edge of the ink supply port 110*a* used for allowing ink to flow in.

Thus, according to the configuration of Embodiment 2, the ink refilled from the ink supply ports 110*a* and 110*b* can be sufficiently heated before flowing into the foaming chambers 108*a* and 108*b*. Therefore, heat transfer and stirring in the ink can be sufficiently performed, and the temperature of the ink that flows into the foaming chambers 108*a* and 108*b* can rise more uniformly. Hence, the discharge amount fluctuation and discharge failure due to an increase in viscosity of the ink can be suppressed with more certainty.

Embodiment 3

Embodiment 3 of the present invention will be described. A composing element the same as Embodiment 1 will be denoted with a same reference sign and name as Embodiment 1, and detailed description thereof will be omitted.

Figure 5:
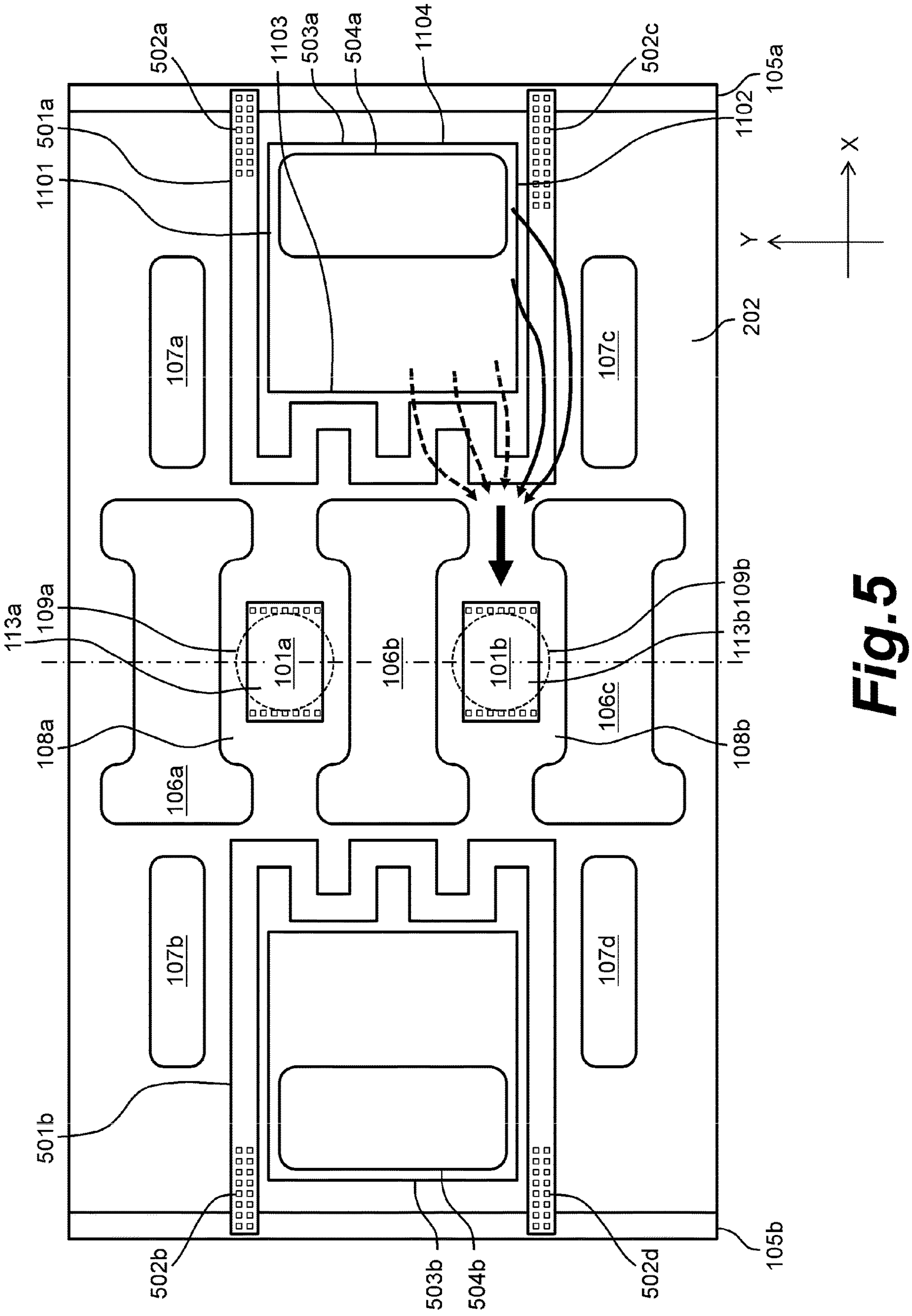
FIG. 5 is a plan view depicting a part of a recording element substrate of Embodiment 3.

FIG. 5 is a plan view depicting a part of the recording element substrate 1 according to Embodiment 3. FIG. 5 is a plan view when the recording head 2 is viewed from the substrate side in the ink discharging direction, and indicates a portion including two nozzles out of a plurality of nozzles disposed on the recording element substrate 1. In Embodiment 3, each sub-heater is disposed in a U shape on the same layer as the temperature sensor installed on the recording element substrate 1, so as to surround the front side and both lateral sides of the ink supply port, and particularly the portion of the sub-heater disposed on the front side of the ink supply port is folded back a plurality of times to create a waveform.

In FIG. 5, ink supply ports 503*a* and 503*b* are disposed more distant from the center of the nozzle array, compared with the ink supply ports 110*a* and 110*b* indicated in FIG. 1. Therefore, the spaces between the ink supply ports 503*a* and 503*b* and the inter-nozzle partition walls 106*a*, 106*b* and 106*c* are wide. Using these spaces, the shape of each sub-heater can be designed to increase the area of the sub-heater.

In Embodiment 3, as illustrated in FIG. 5, a sub-heater 501*a* is disposed in a U shape, so as to surround the front side and the lateral sides of the ink supply port 503*a*, just like the sub-heater 401*a* of Embodiment 2. Specifically, the sub-heater 501*a* is disposed along the lateral side edges 1101 and 1102 and the front side edge 1103 out of the peripheral edge of the ink supply port 503*a*, so as to surround the ink supply port 503*a* in a U shape. Furthermore, a part of the sub-heater 501*a* disposed along the front side edge 1103 of the ink supply port 503*a* is folded back a plurality of times to create a waveform. Thereby, the area of the portion of the sub-heater 501*a* disposed on the front side of the ink supply port 503*a* increases.

One end of the sub-heater 501*a* is connected to a switch element (not illustrated) via a conductive plug 502*a*, and the switch element is connected to a power supply line (not illustrated) via a wiring pattern of the second wiring layer 204. The other end of the sub-heater 501*a* is connected to the wiring pattern (not illustrated) of the second wiring layer 204 via a conductive plug 502*c*, and this wiring pattern is grounded to a ground line (not illustrated). These configurations are the same as those of the sub-heater 401*a* of Embodiment 2.

The relationship between ink supply ports 504*a* and 504*b* and the ink supply ports 503*a* and 503*b* is the same as the relationship between the supply passages 111*a* and 111*b* and the ink supply ports 110*a* and 110*b* of Embodiment 1.

Just like the configuration of the sub-heater 501*a*, the portion of the sub-heater 501*b* disposed on the front side of the ink supply port 503*b* is also folded back a plurality of times to create a waveform. The configuration of the sub-heater 501*b* and the conductive plugs 502*b* and 502*d* is also the same as the configuration of the sub-heater 501*a* and the conductive plugs 502*a* and 502*c*.

Thereby, as indicated by the broken-lined arrow marks in FIG. 5, a larger amount of ink refilled from the front side of the ink supply port 503*a* can be heated for a longer time by the sub-heater 501*a*. Therefore, the temperature different from the ink refilled from the lateral sides of the ink supply port 503*a*, as indicated by the solid-lined arrow marks, decreases, and the temperature of the ink that flows into the foaming chambers 108*a* and 108*b* can be uniformly increased. Hence, the discharge amount fluctuation and discharge failure due to an increase in viscosity of the ink can be suppressed with more certainty.

Embodiment 4

Embodiment 4 of the present invention will be described. A composing element the same as Embodiment 1 will be denoted with a same reference sign and name, and detailed description thereof will be omitted.

Figure 6:
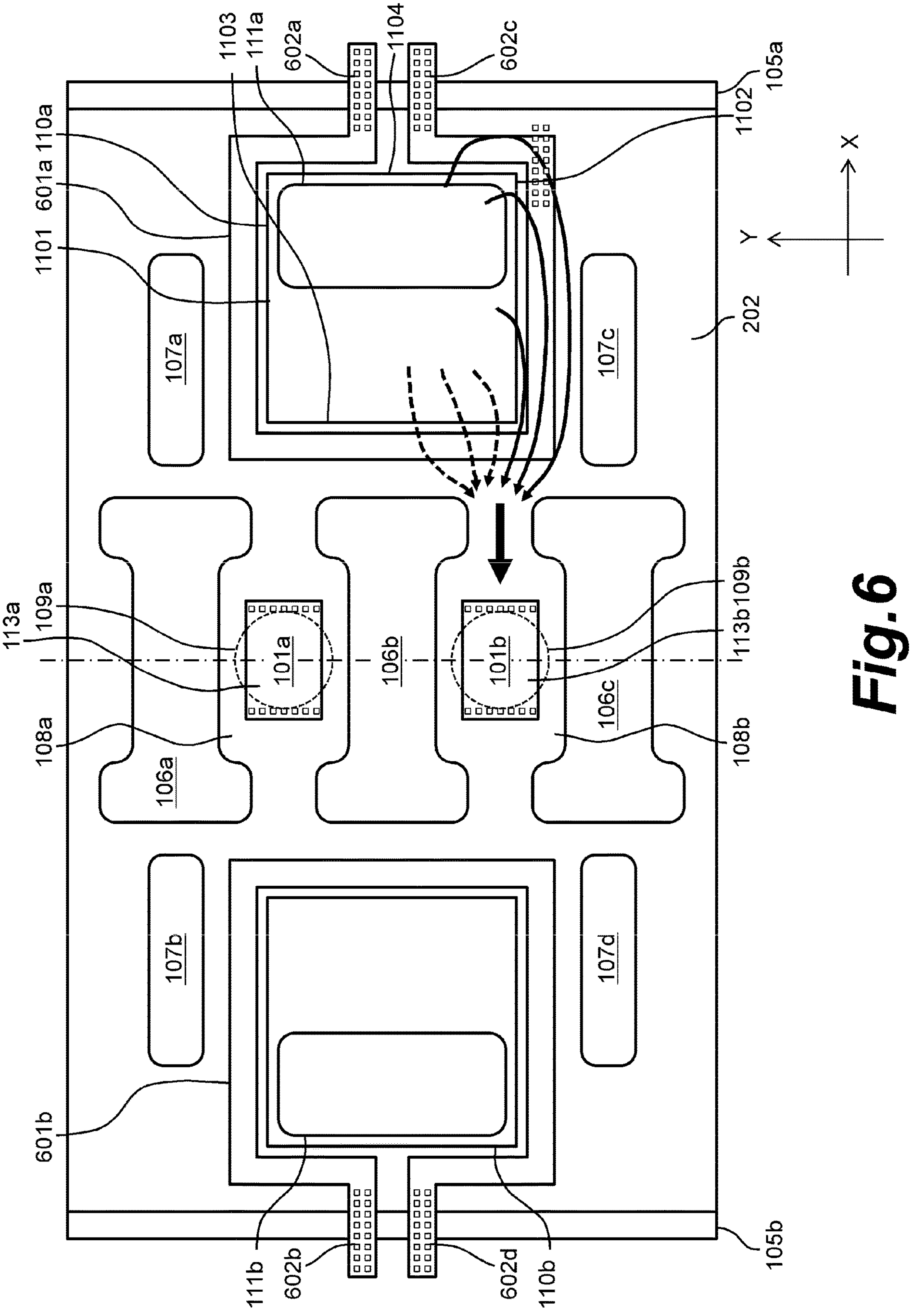
FIG. 6 is a plan view depicting a part of a recording element substrate of Embodiment 4.

FIG. 6 is a plan view depicting a part of the recording element substrate 1 according to Embodiment 4. FIG. 6 is a plan view when the recording head 2 is viewed from the substrate side in the ink discharging direction, and indicates a portion including two nozzles out of a plurality of nozzles disposed on the recording element substrate 1. In Embodiment 4, each sub-heater is disposed in an Ω shape on the same layer as the temperature sensor installed on the recording element substrate 1, so as to entirely surround the ink supply port.

In a case where the height of the ink passage 202 is relatively low, ink flows behind the ink supply port 110*a* when refilled, as indicated by the solid-lined arrow marks in FIG. 6, and the flow of the ink does not stagnate very much in the rear side of the ink supply port 110*a*. The ink that flows behind the ink supply port 110*a* flows back into the front side of the ink supply port 110*a* along the inter-nozzle array partition wall 105*a* and the inter-ink supply port partition wall 107*c*, and flows into the foaming chambers 108*a* and 108*b*.

Therefore, as illustrated in FIG. 6, a sub-heater 601*a* is disposed in an Ω shape so as to entirely surround the ink supply port 110*a*. Specifically, the sub-heater 601*a* is disposed along the lateral side edges 1101 and 1102, the front side edge 1103 and the rear side edge 1104, out of the peripheral edge of the ink supply port 110*a*, so as to entirely surround the ink supply port 110*a* in an Ω shape.

One end of the sub-heater 601*a* is connected to a switch element (not illustrated) via a conductive plug 602*a*, and the switch element is connected to a power supply line (not illustrated) via a wiring pattern of the second wiring layer 204. The other end of the sub-heater 601*a* is connected to the wiring pattern (not illustrated) of the second wiring layer 204 via a conductive plug 602*c*, and this wiring pattern is grounded to a ground line (not illustrated). These configurations are the same as the sub-heaters 102*a* and 102*c* in Embodiment 1.

According to the configuration of the sub-heater 601*a* of Embodiment 4, compared with the ink that flows from the front side or the lateral sides of the ink supply port 110*a*, the ink that flows from the rear side of the ink supply port 110*a* passes above the sub-heater 601*a* for a longer distance, taking a longer heating time. Therefore, the temperature of the ink that flows from the rear side of the ink supply port 110*a* becomes higher than the temperature of the ink that flows from the front side or lateral sides of the ink supply port 110*a*, and the temperature distribution in the ink passage 202 in the highest direction becomes more uniform. Thus, ink flows in from the rear side, lateral sides and front side of the ink supply port 110*a*, and each ink of which heating time by the sub-heater 601*a* is different from each other, having a different temperature, and a different temperature distribution, merges at the entrance of the foaming chamber 108*b*; hence, the temperature of the ink becomes more uniform.

The relationship between a sub-heater 601*b* and the ink supply port 110*b* is the same as the relationship between the sub-heater 601*a* and the ink supply port 110*a*. The configuration of the sub-heater 601*b* and the conductive plugs 602*b* and 602*d* is the same as the configuration of the sub-heater 601*a* and the conductive plugs 602*a* and 602*c*.

According to Embodiment 4, the ink refilled from the ink supply port 110*a* to the ink passage 202 is heated by the sub-heater 601*a*, and flows into the foaming chambers 108*a* and 108*b* in a uniformly heated state. Hence, the discharge amount fluctuation and discharge failure due to an increase in viscosity of the ink can be suppressed with more certainty.

Other Embodiments

Embodiments 1 to 4 have been described above, but the present invention is not limited thereto. For example, the shape of the ink supply port is not limited to a rectangle. For example, even if the shape of the ink supply port is a circle, the sub-heater may be disposed along at least a part of the peripheral edge of the ink supply port, whereby the same effect as each embodiment described above can be implemented. In this case, instead of the sub-heater disposed along the lateral side edges, front side edge and rear side edge of the rectangular ink supply port, a sub-heater may be disposed along the arcs of the lateral sides, front side and rear side of the ink supply port. In the wiring portion 233, the layer on which the sub-heater is installed is not limited to the same layer as the temperature sensor, but may be the same layer as the discharging heater or the cavitation resistant film. Further, the sub-heater may be disposed along the peripheral edge of each ink supply port included in an ink supply port array on one side, out of the ink supply port arrays disposed on both sides of the nozzle array. Further, the ink supply port array may be disposed only on one side of the nozzle array. The wiring layer is not limited to the two-layer configuration, but may be a three-layer or four-layer configuration, for example. A number of nozzles included in one nozzle group, corresponding to one ink supply port, may be two or more. The discharging actuator to apply energy to the ink to discharge the ink droplets is not limited to the heater, but may be a piezoelectric element, for example.

According to the present invention, a recording element substrate and a recording device equipped with a sub-heater that can heat such liquid as ink more uniformly can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-184691, filed on Nov. 18, 2022, which is hereby incorporated by reference herein in its entirety.

What is claimed is:

1. A recording element substrate comprising:

a discharging port array which is disposed on a front surface of the recording element substrate, and includes a plurality of discharging ports arrayed in an array direction;

a plurality of nozzles which extend in a direction intersecting with the front surface of the recording element substrate, and are connected to the plurality of discharging ports, respectively;

a passage forming portion in which a plurality of individual passages and a common passage are formed, the plurality of individual passages extending in a direction along the front surface of the recording element substrate and being connected to the plurality of nozzles, respectively, and the common passage being connected to the plurality of individual passages;

a plurality of supply ports which are disposed on the common passage and are arrayed along the array direction, and are disposed such that, in a case where the plurality of nozzles are divided into a plurality of nozzle groups and each nozzle group includes one or a plurality of nozzles, the plurality of supply ports are disposed at positions corresponding to the plurality of nozzle groups on the common passage, respectively; and a plurality of supply passages which extend from the plurality of supply ports to a rear surface of the recording element substrate in a direction intersecting with the rear surface of the recording element substrate, wherein a plurality of heaters configured to heat liquid flowing through the common passage are provided for each of the plurality of supply ports along at least a part of a peripheral edge of the supply port.

2. The recording element substrate according to claim 1, wherein at least one of the heaters is disposed along a portion of the peripheral edge of the supply port, the portion extending in a direction from the supply port to the individual passage.

3. The recording element substrate according to claim 1, wherein the peripheral edge of the supply port has a rectangular shape constituted of:

a front side edge which extends in a direction along the array direction of the plurality of nozzles and is located on the side closer to the individual passage;

a rear side edge on the opposite side of the front side edge; and two lateral side edges which extend in a direction intersecting with the array direction, from the supply port toward the individual passage, and at least one of the heaters is disposed along the lateral side edges of the peripheral edge of the supply port.

4. The recording element substrate according to claim 3, wherein at least one of the heaters is additionally disposed along the front side edge of the peripheral edge of the supply port.

5. The recording element substrate according to claim 4, wherein at least one of the heaters is additionally disposed along the rear side edge of the peripheral edge of the supply port.

6. The recording element substrate according to claim 4, wherein the portion of the at least one heater disposed along the front side edge is folded a plurality of times to create a waveform.

7. The recording element substrate according to claim 1, wherein the plurality of individual passages, the common passage, the plurality of supply ports, the plurality of supply passages and the plurality of heaters are disposed on both sides of a nozzle array constituted of the plurality of nozzles.

8. The recording element substrate according to claim 1, wherein the plurality of individual passages, the common passage, the plurality of supply ports, the plurality of supply passages and the plurality of heaters are disposed on both sides of a nozzle array constituted of the plurality of nozzles so as to be symmetric with respect to the nozzle array.

9. The recording element substrate according to claim 8, wherein two heaters at symmetric positions with respect to the nozzle array are electrically connected.

10. The recording element substrate according to claim 1, wherein two heaters adjacent to each other in the array direction are electrically connected.

11. The recording element substrate according to claim 1, wherein the nozzle group is constituted of a plurality of nozzles adjacent to each other.

12. The recording element substrate according to claim 1, further comprising a plurality of discharging actuators configured to apply energy to liquid so as to discharge the liquid from the plurality of discharging ports, respectively.

13. The recording element substrate according to claim 12, wherein each discharging actuator is a discharging heater disposed on the individual passage.

14. The recording element substrate according to claim 13, further comprising:

a wiring portion which is disposed between the passage forming portion and the rear surface of the recording element substrate, and which is formed by layering at least an insulator layer and a wiring layer, wherein each heater and each discharging heater are disposed on a same layer in the wiring portion.

15. The recording element substrate according to claim 13, further comprising:

a wiring portion which is disposed between the passage forming portion and the rear surface of the recording element substrate, and which is formed by layering at least an insulator layer and a wiring layer; and a temperature sensor which is disposed on a lower layer that is lower than the discharging heater in the wiring portion, wherein each heater and the temperature sensor are disposed on a same layer in the wiring portion.

16. The recording element substrate according to claim 12, further comprising:

a cavitation resistant film which is disposed at a position corresponding to the discharging actuator in the individual passage, wherein each heater is disposed on a same layer as the cavitation resistant film.

17. A recording device comprising:

a liquid discharging head including the recording element substrate according to claim 1; and a control unit configured to control the heaters, wherein image recording is performed on a recording medium using ink, which is liquid discharged from the liquid discharging head.

18. The recording device according to claim 17, wherein the control unit controls the heaters such that a heating value of each heater in the case of performing image recording becomes higher than a heating value of the heater in the case of not performing the image recording.

19. The recording device according to claim 17, wherein the plurality of individual passages, the common passage, the plurality of supply ports, the plurality of supply passages and the plurality of heaters are disposed on both sides of a nozzle array constituted of the plurality of nozzles, wherein in the case of performing image recording, the control unit allows the liquid flow into the common passage from both of the supply ports disposed on each side of the nozzle array and heat both of the heaters disposed on each side of the nozzle array, and in the case of not performing image recording, the control unit circulates the liquid by allowing the liquid flow into the common passage from one of the supply ports disposed on each side of the nozzle array and allowing the liquid of the common passage to flow out of the other supply port, and heats a heater corresponding to the supply port from which the liquid flows into the common passage, among the heaters disposed on each side of the nozzle array.

* * * * *